Nov. 7, 1950   A. W. OEHLER   2,529,180
HARVESTING MECHANISM
Filed Aug. 2, 1946   5 Sheets-Sheet 1
FIG. I
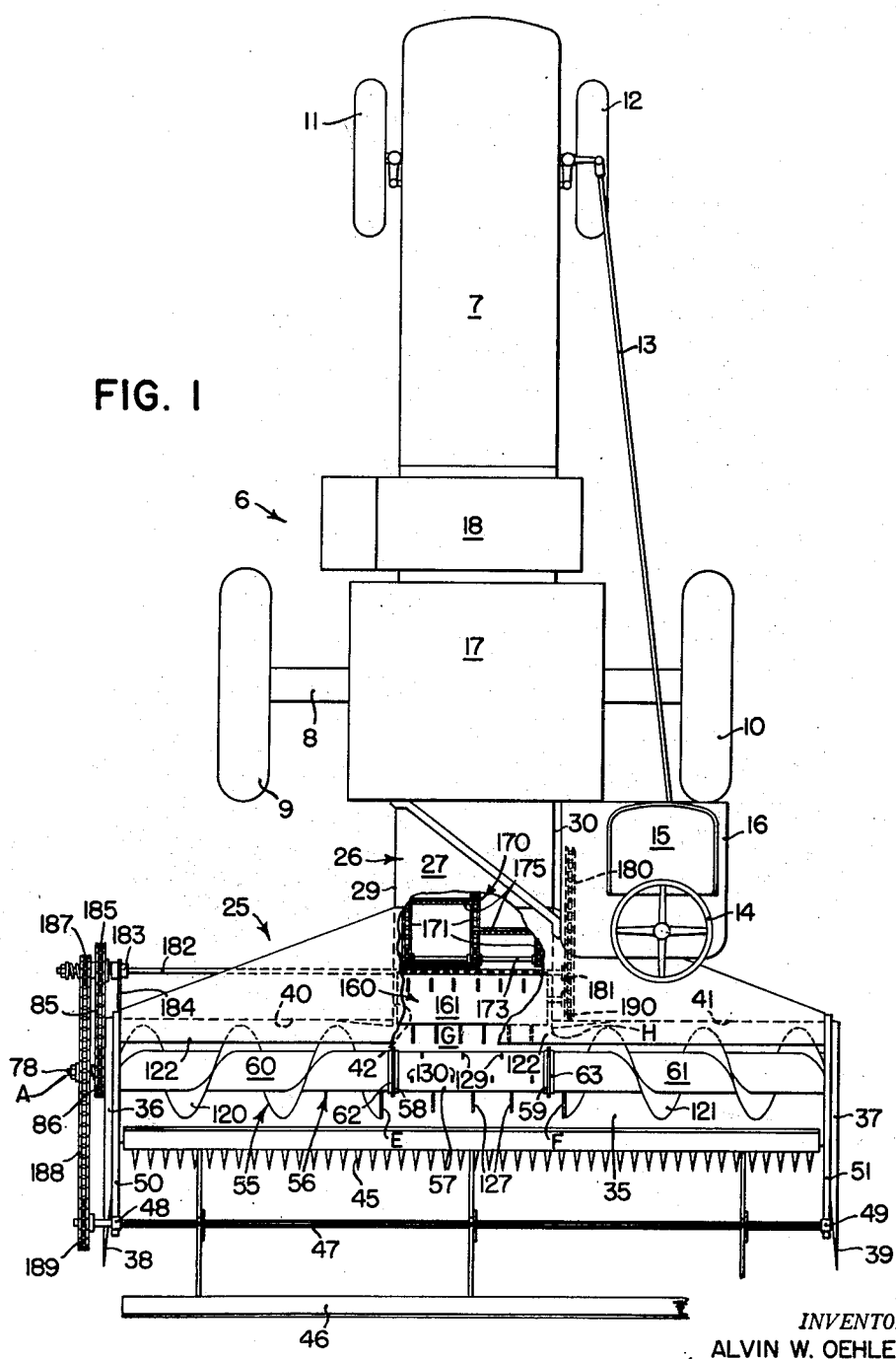
INVENTOR.
ALVIN W. OEHLER
ATTORNEYS.

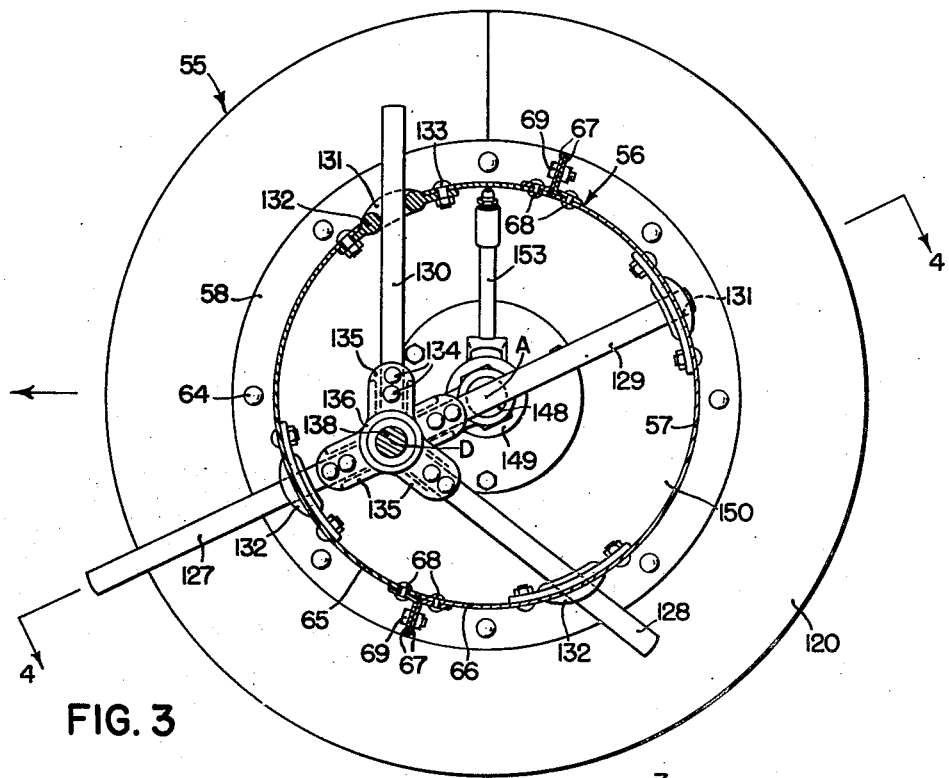
FIG. 3
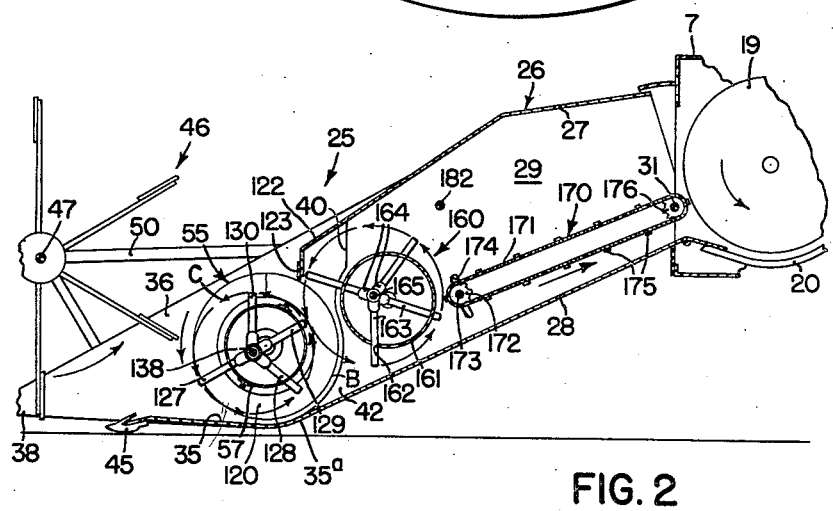
FIG. 2
INVENTOR.
ALVIN W. OEHLER
ATTORNEYS

Nov. 7, 1950     A. W. OEHLER     2,529,180
HARVESTING MECHANISM
Filed Aug. 2, 1946     5 Sheets-Sheet 3
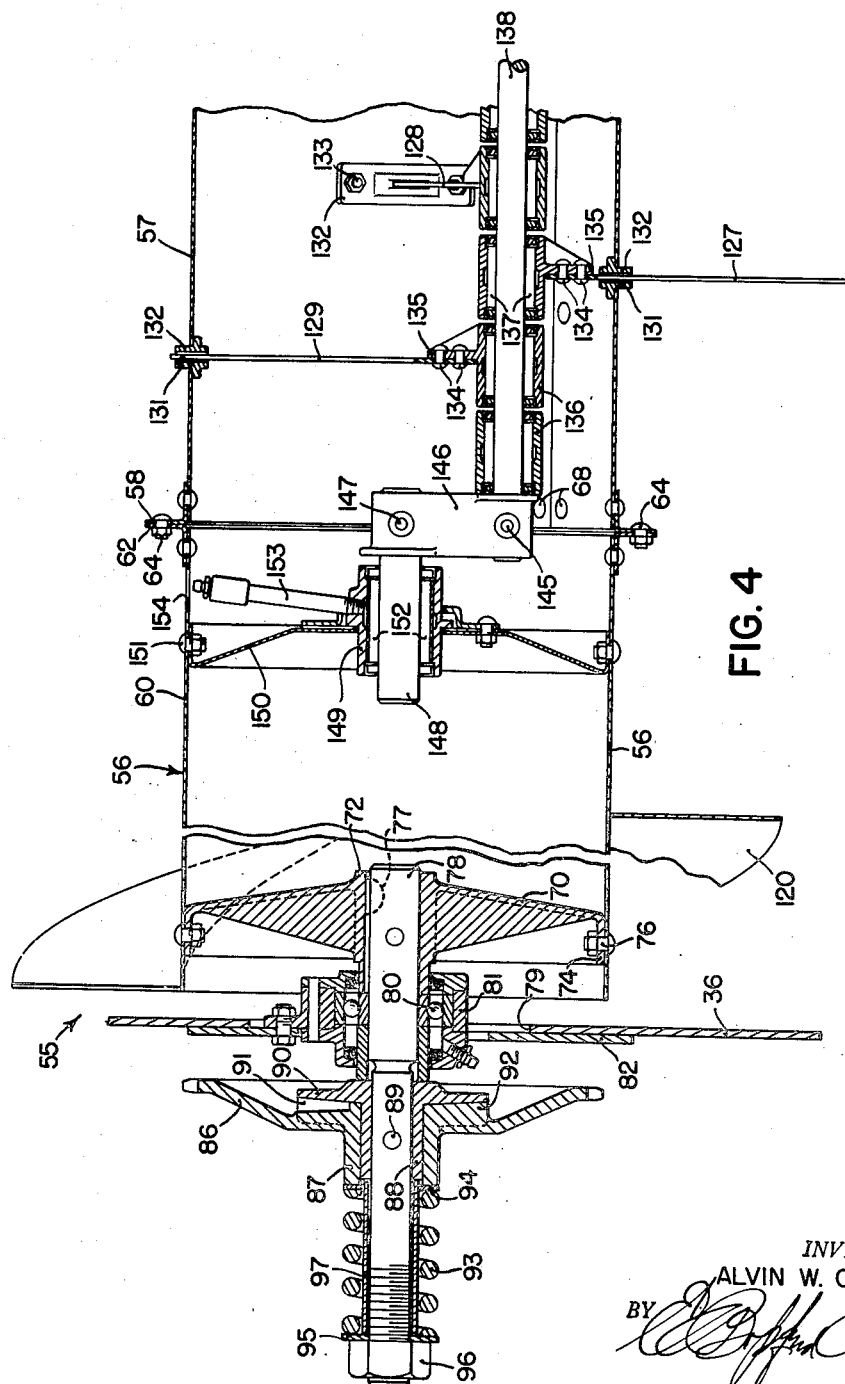
FIG. 4
INVENTOR.
ALVIN W. OEHLER
BY 
ATTORNEYS.

INVENTOR.
ALVIN W. OEHLER
BY
ATTORNEYS.

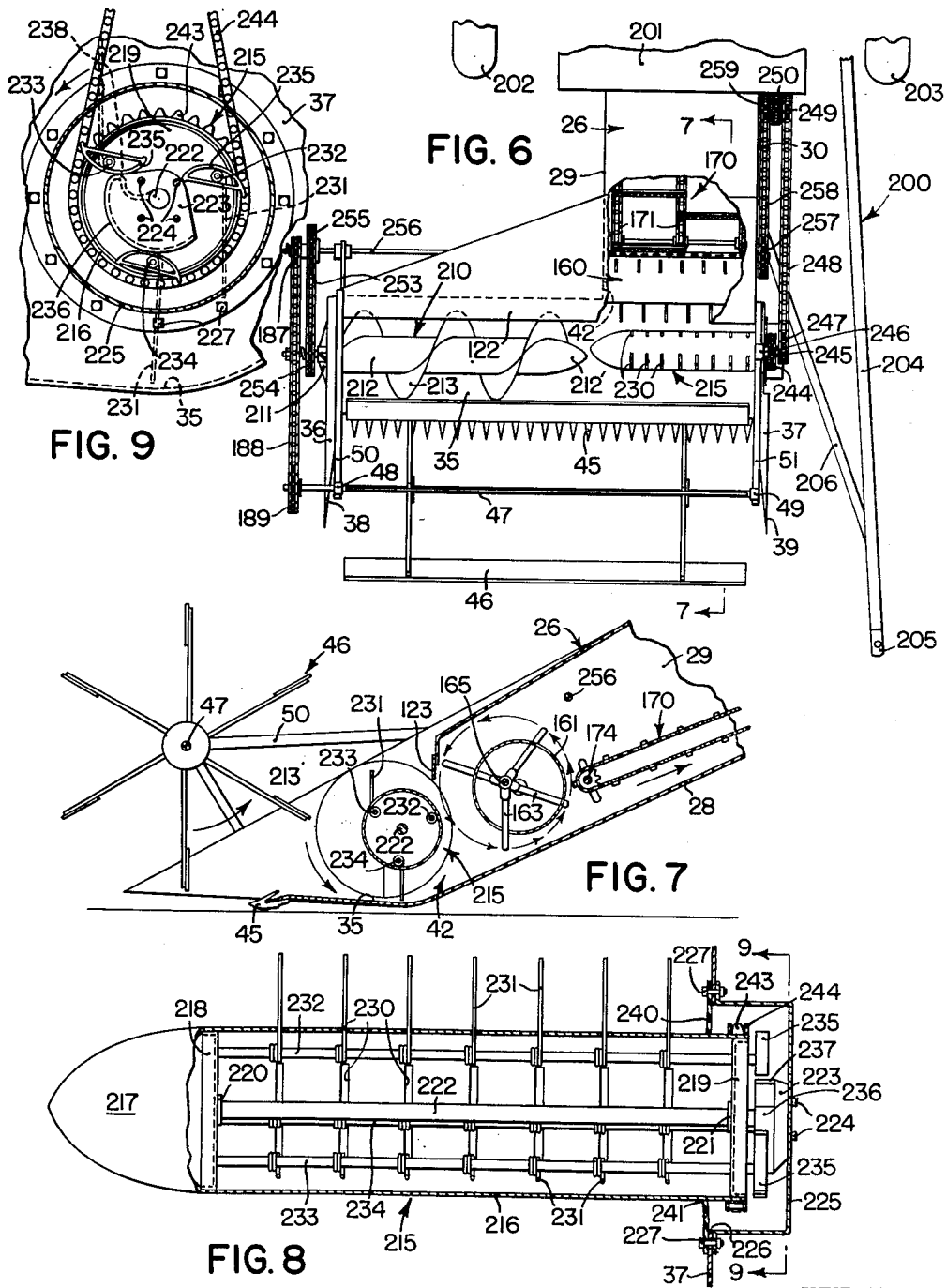

Patented Nov. 7, 1950

2,529,180

UNITED STATES PATENT OFFICE 2,529,180

HARVESTING MECHANISM

Alvin W. Oehler, Moline, Ill., assignor to Deere & Company, Moline, Ill., a corporation of Illinois Application August 2, 1946, Serial No. 687,875

20 Claims. (Cl. 198—104)

The present invention relates generally to harvesters and more particularly to harvesters of the type comprising a comparatively narrow longitudinally extending body or housing and a harvester platform which extends laterally from the forward end of the housing, and has for its principal object the provision of novel and improved conveying and feeding mechanism for moving the harvested crops along the platform and feeding them rearwardly into the housing, where they are threshed or otherwise treated, and collected. Heretofore, comparatively few difficulties have been encountered with harvesting mechanism which feeds the harvested crops laterally through an opening in one side wall of the longitudinally extending thresher body, where the cutter bar is offset laterally outwardly from the feeder opening. Likewise, most of the problems have been solved pertaining to feeding harvested crops directly rearwardly through an opening in the front end of a harvester body or housing, from a cutter bar which is disposed directly ahead of the housing. Many attempts have been made, however, to provide efficient conveying and feeding mechanism for that class of harvester in which the cutter bar extends across the front of the housing and also continues across the front of a laterally extending platform. With this type of harvester, a portion of the harvested crop must be fed directly rearwardly from that part of the cutter bar directly in front of the housing, while another part of the harvested crop must be fed laterally inwardly along the platform and then turned rearwardly into the housing, requiring a merging of the two streams of crops. It is with this third type of harvester feeder mechanism that results have not been uniformly satisfactory under varying crop conditions, for it was found that any feeding device provided in the front opening in the housing, which was effective to convey one of the streams of crops into the housing, would tend to interfere with the flow of the crop stream coming in at right angles thereto.

It is, therefore, one of the principal objects of the present invention to provide conveying and feeding mechanism which is effective to feed crops directly rearwardly from the cutter bar into the harvester body and also to convey crops laterally from the laterally extending harvester platform and feed the same rearwardly into the body together with the first mentioned crop stream.

Heretofore, the auger type conveyor has operated satisfactorily under many varying crop conditions, where the conveyor extends into the side of the harvester body, for the auger blade itself can be continued into the housing in such a manner as to urge the crop material rearwardly into the body, such as, for example, by making the auger blade straight, within the body, and parallel to the axis of the auger. However, when this type of auger is used in connection with a harvester body having an entrance opening in the front end thereof, with the cutter bar extending across in front of the opening, the crops which are severed by this portion of the cutter bar tend to pile up in front of the auger or to wind around the latter under some crop conditions. If the auger blades are omitted from the portion of the auger shaft in front of the body opening, the shaft has a blocking effect on the crops, while if the shaft be omitted from the portion of the platform in front of the body opening, the auger must be rotatably supported from the end wall of the platform, which involves a long overhanging bearing, which is difficult to construct and maintain, while a second bearing for the auger at the edge of the opening also tends to interfere with the flow of crops.

According to the principles of the present invention, the shaft of the auger conveyor is made tubular, and of comparatively large diameter, and is perforated to receive a plurality of crop engageable teeth that are adapted to be projected through the perforations into engagement with the crops for the purpose of sweeping the crops rearwardly under the auger shaft, the fingers being retractable through the perforations to disengage from the crops behind the auger shaft. The mechanism for retracting and projecting the fingers is contained within the auger shaft and is protected so that it does not interfere with the flow of crops. This feeding mechanism takes care of the crops that are severed directly in front of the body opening, for feeding the severed crops rearwardly directly into the opening. The crops that are severed and deposited on the laterally extending platform are conveyed laterally inwardly by the helical auger blade, in cooperation with a stripper plate of conventional construction, behind the auger, and are discharged behind the auger in front of the body opening. A second feeder device is provided within the body opening, in the form of a rotatable drum, which also has perforations and retractable teeth, the teeth being adapted to project forwardly into proximity with the ends of the retracted teeth within the auger shaft, thereby stripping the crops from the auger shaft and also engaging the crops which are discharged laterally from the platform, sweeping them under the second feeder drum, into the body housing, after which the fingers are retracted into the rear of the rotating drum to disengage them from the crops. A third crop propelling device behind the drums then conveys the material to the threshing cylinder or other mechanism. It has been found that these two sets of retractable fingers cooperate to merge the two streams of crops and move them without interference into the body housing.

These and other objects and advantages of the present invention will be apparent to those skilled in the art after a consideration of the following description, in which reference is had to the drawings appended hereto, in which Figure 1 is a top plan view of a self-propelled harvester thresher or combine embodying the principles of the present invention, a portion of the top of the housing being broken away to expose the details of construction;

Figure 2 is a sectional elevational view taken substantially along the central fore and aft extending vertical plane through the forward end of the combine, and drawn to a slightly enlarged scale;

Figure 3 is a sectional elevational view of the auger conveyor as viewed in Figure 2, but drawn to a further enlarged scale;

Figure 4 is a sectional view of the right-hand end portion of the auger, the view being taken along the line 4—4 of Figure 3, a portion of the conveyor being broken away to conserve space;

Figure 6 is a top plan view of the forward portion of a combine illustrating a modified form of my invention, a portion of the housing being broken away to expose the crop propelling mechanism;

Figure 7 is a sectional elevational view taken along the line 7—7 in Figure 6 and drawn to an enlarged scale;

Figure 8 is a sectional plan view of the crop propelling device; and

Figure 9 is a sectional elevational view taken along the line 9—9 in Figure 8.

Figure 5:
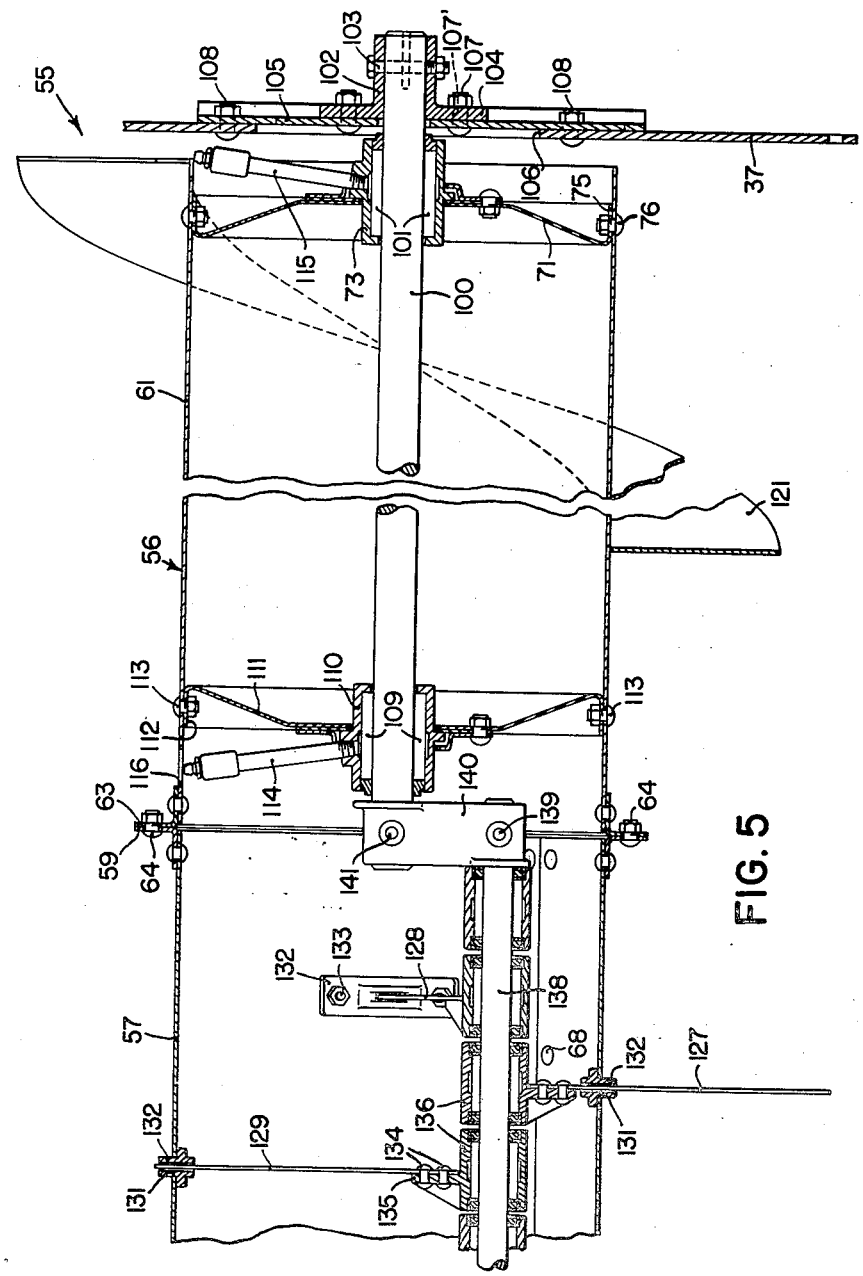
Figure 5 is a similar sectional view of the left-hand end of the auger conveyor, a portion of the conveyor being broken away.

Referring now to the drawings, a self-propelled combine is indicated in its entirety by reference numeral 6 and comprises a fore and aft or longitudinally extending body or housing 7, within which is disposed suitable crop treating mechanism, such as, for example, threshing and separating mechanism well known to those skilled in the art. The body is mounted on a transverse axle 8 disposed near the forward end thereof and carried on a pair of laterally spaced traction wheels 9, 10. The rear end of the body is carried on a pair of laterally spaced dirigible wheels 11, 12, which are connected by a steering control rod 13 with a steering wheel 14 disposed in front of an operator's seat 15. The seat 15 is mounted on an operator's platform 16 supported in offset relation near the forward end of the body housing 7. A grain storage tank 17 is mounted over the housing 7 directly above the main axle 8, and a power plant 18 is mounted over the housing 7 directly behind the grain tank 17, and is connected by suitable power transmitting mechanism (not shown) for supplying power to the traction wheels 9, 10 and also to the threshing and separating mechanism. The threshing mechanism comprises a threshing cylinder 19 rotatably mounted in the forward end of the housing 7 over a threshing concave 20 (see Figure 2).

Harvesting mechanism, indicated generally by reference numeral 25, is mounted on and extends forwardly from the main housing 7 and serves to sever the crops from the field and to convey the crops to the threshing cylinder 19 and comprises a longitudinally extending feeder housing 26, comprising an inclined bottom wall or floor plate 28 extending downwardly and forwardly from the threshing cylinder 19 at the forward end of the concave 20, a pair of vertical side walls 29, 30, the latter being spaced laterally to form continuations of the side walls of the housing 7, and a top wall 27 connecting the upper edges of the side walls 29, 30. The feeder housing 26 is swingably connected to the forward end of the housing 7 by means of a transverse shaft 31.

Ahead of the feeder housing 26 is a transverse platform structure in the form of an auger trough or grain pan 35, which extends across in front of the feeder housing 26 and extends laterally in both directions therefrom as a bottom wall element 35a to a pair of end walls 36, 37 disposed in vertical planes spaced outwardly of the fore and aft extending planes of revolution of the traction wheels 9, 10, respectively. The end walls are extended forwardly beyond the front edge of the platform 35 to provide dividers 38, 39. The platform extensions are provided with generally upright back walls 40, 41, which extend upwardly to meet the top wall 27 and which also extend laterally from the side walls 29, 30 of the feeder house 26. The back walls 40, 41 terminate at their inner ends substantially in the planes of the side walls 29, 30, providing therebetween a forwardly directed feed opening 42 in the forward end of the feeder house 26, for receiving harvested crops from the auger trough 35.

Cutting mechanism in the form of a conventional cutter bar 45 extends across the forward edge of the platform or auger trough 35 between the two end walls 36, 37 and across in front of the feeder house opening 42. Inasmuch as the machine is self-propelled, there is no tractor ahead of the combine to run over any of the standing crops. A conventional harvester reel 46 extends transversely between the end walls 36, 37 over the cutter bar 45 and is provided with a supporting shaft 47 journaled in a pair of bearings 48, 49 which are carried on a pair of supporting arms 50, 51, respectively, the latter being rigidly mounted on the opposite ends of the platform 35.

The grain severed by the cutter bar 45 is laid rearwardly upon the platform 35 by the reel 46, and it is evident that that portion of the grain which falls directly in front of the feeder house opening 42 must be moved directly rearwardly into the latter, while the grain that falls on the lateral extensions of the platform must be moved laterally inwardly to a position in front of the housing opening 42 and then must be moved rearwardly into the housing with the stream of crops which are moved directly rearwardly into the housing from the portion of the cutter bar in front of the latter.

The grain is moved on the platform 35 by means of an auger type conveyor 55, which comprises a first feeder element made up as a tubular shaft or core 56, formed in three sections or portions disposed in axial alignment and secured together in end to end relation and rotatable about axis A. The central section 57 of the hollow shaft 56 is substantially coextensive with the crop receiving opening 42 in the forward end of the feeder housing 26, and is formed in two complementary hemicylindrical portions 65, 66 having axially extending angle members 67 secured along the edges by rivets 68, thus serving as flanges which are rigidly secured together by bolts 69. The bolts 69 are readily detachable to provide access to the interior of the shaft section 57. The portions 65, 66 are also provided with peripherally extending angle members 58, 59 secured thereto at opposite ends, respectively, to form annular flanges. The outer end sections 60, 61 of the tubular shaft 56 are provided with annular flanges 62, 63 extending peripherally adjacent the inner ends of the tubular sections 60, 61, respectively. The flanges 62, 63 are secured to the adjacent flanges 58, 59, respectively, of the inner tubular section 57, by means of suitable bolts 64, thus securing the three tubular sections 56, 60, 61 together in one unitary shaft structure.

The tubular shaft 56 is rotatably supported at opposite ends, respectively, by means of a pair of end plates or spiders 70, 71, which are provided with hubs 72, 73 and peripheral flange portions 74, 75 coaxial with the respective hubs 72, 73, respectively. The flange portions 74, 75 are secured inside the ends of the tubular members 60, 61 by bolts 76.

Referring particularly to Figure 4, the hub 72 is rigidly fixed by means of a key 77 to a stub shaft 78, which extends outwardly from the end of the tubular member 60 through an opening 79 in the end wall 36. The shaft 78 is journaled in a ball bearing 80 which is mounted in a bearing housing 81, secured to a plate 82 which is fastened on the outer side of the end wall 36 of the platform. The auger conveyor 55 is driven by a chain 85 which is trained over a sprocket 86 mounted on a hub 87 which is journaled on a sleeve 88, fixed to the shaft 78 by a suitable pin 89. A radially outwardly extending clutch disk 90 is formed integrally with the sleeve 88 and is provided with axially facing teeth 91 which mesh with cooperative teeth 92 on the adjacent face of the chain sprocket 86. The hub 87 is urged axially on the shaft 78 to hold the teeth 91, 92 in intermeshing relation, by means of a compression spring 93, which bears against a washer 94 at the outer end of the sprocket hub 87. The reaction of the spring 93 is taken against a washer 95, which is secured on the end of the shaft 78 by means of a nut 96 threaded on the shaft 78. The nut 96 is tightened against a sleeve 97 which bears against the inner end of the sleeve 88 and serves as a limit to determine the amount of compression on the spring 93. In case the auger shaft 56 becomes blocked and ceases to rotate, the drive chain 85 continues to drive the sprocket 86, but the intermeshing teeth 91, 92 are adapted to slip into and out of mesh with each other, forcing the hub 87 against the compression of the spring 93.

The spider 71 is mounted on a shaft 100, by means of suitable bearing rollers 101 within the hub 73. The shaft 100 is rigidly mounted in a hub 102 and is secured against rotation relative thereto by means of a pin 103. The hub 102 is provided with a radially extending flange 104 which is secured to a plate 105 by bolts 107 extending through arcuate slots 107' in the plate 105, providing for limited angular movement of the hub 102 and shaft 100 relative to the end wall 37.

The plate 105 covers an opening 106 in the end wall 37 and is suitably supported on the latter by bolts 108. The shaft 100 extends coaxially into the tubular section 61 of the auger shaft 56 and is supported on rollers 109 in a bearing hub 110. The bearing hub 110 is mounted on a spider 111, which has an axially turned peripherally extending flange 112, which fits inside of the inner end of the shaft section 61 and is secured therewithin by means of bolts 113, rivets, or the like. The bearing hubs 110, 73 are lubricated through suitable lubricant fittings 114, 115, respectively. The inner fitting 114 is accessible through a hole 116 in the tubular shaft 61.

The two outer shaft sections 60, 61 are provided with oppositely wound helical auger blades or vanes 120, 121, respectively. The auger blades encircle the shaft sections 60, 61, extending from the outer ends thereof substantially to the supporting flanges 62, 63 at the inner ends of the sections 60, 61, respectively, thus having their inner terminal ends respectively at opposite sides of the feed or crop-receiving opening 42. Both of the helical blades 120, 121 are wound in such a direction that when the auger shaft 56 is rotated in a counterclockwise direction, as viewed in Figure 2, the crops on the platform 35 at both ends of the latter are moved downwardly and rearwardly against the bottom and rear wall elements of the auger trough and are simultaneously conveyed toward the center of the platform. The flights generate a cylinder B as the augers rotate.

A stripper plate 122 extends forwardly and downwardly from the back walls 40, 41, forming an extension of the top wall 27 of the feeder housing 26 and terminating in a vertical edge strip 123, as viewed in Figure 2. The stripper edge plate 123 terminates closely adjacent the outer periphery of the auger blades 120, 121, and functions to strip the harvested crops from the auger blades during operation, as the blades gather the crops under the tubular shaft 56 and sweep the crops upwardly along the back walls 40, 41. Thus, the stripper plate 122 prevents the crops from being wound around the auger and carried forwardly over the top of the shaft 56.

Thus, most of the harvested crops are carried to the space between the auger and the back wall and beneath the overhanging stripper plate on each side of the housing opening 42, and are propelled laterally inwardly by the action of the helical blades 120, 121 and are discharged at the inner ends of the helical blades immediately in front of the housing opening 42.

The center section or element 57 of the tubular shaft 56 has its peripheral wall provided with four rows of crop-engageable elements or fingers 127, 128, 129, 130, which are disposed within the shaft section 57 and extend outwardly therefrom through suitable perforations or openings 131 in said peripheral wall. Each of the openings 131 is reenforced and protected by a bushing 132, which is fixed to the section 57 around the respective opening by suitable rivets 133. The inner end of each of the fingers is secured by rivets 134 to a bracket arm 135 formed integrally with a bearing hub 136. Each of the hubs 136 is provided with bearing rollers 137, engaging a supporting or control shaft 138. One end of the shaft 138 is rigidly fixed by a diametrically extending pin 139 to a bracket arm 140, which is secured by a diametrically extending pin 141 to the supporting shaft 100. The opposite end of the shaft 138 is secured by a pin 145 to a bracket arm 146, which in turn is rigidly fixed by a pin 147 to a stub shaft 148.

The shaft 148 is disposed coaxially with the shaft 100 and with the auger in the tube 56 and is journaled in a bearing hub 149 mounted on a spider 150 which is secured by bolts or rivets 151 within the tubular section 60 adjacent the securing flange 62. The bearing 149 is provided with rollers 152 to insure smooth rotation of the tubular shaft 56 on the stationary shaft 100 and stationary stub shaft 148. Thus, the finger supporting shaft 138 is supported in a radially offset position from the axis of rotation of the auger member 55 and is held stationary while the auger rotates. Each of the finger supporting hubs 136 thus rotates about the shaft 138, being propelled by the associated finger which extends outwardly through its respective bushing 132. The bearing hub 149 may be lubricated through a fitting 153 which extends outwardly to a point adjacent a hole 154 in the tubular shaft section 60.

The shaft 138 provides an axis D that is offset forwardly and downwardly from the axis of rotation A of the auger member 55, as best viewed in Figures 2 and 3, with the result that the fingers project to a maximum extent in front of the auger tube 56 in the position indicated at 127 in Figure 3. The outer ends of the fingers travel in a circular path, or generate a cylinder C, about the offset axis of the shaft 138; hence, this generated cylinder is eccentric as respects the cylinder B generated by the auger and is accordingly spaced farther ahead of the general transverse upright plane including the rear walls 40 and 41. A limited angular adjustment of this position of maximum projection can be obtained by loosening the bolts 107 and shifting the hub 102 and shaft 100 angularly relative to the plate 105. As the auger shaft 56 rotates, the fingers are swung downwardly and rearwardly in engagement with crops in front of and beneath the auger shaft, propelling the crops rearwardly under the shaft, and at the same time retracting the fingers into the shaft section 57 until they are completely retracted in the position indicated at 129 in Figure 3, behind the auger shaft. The surface of the drum section 57 and the fingers 127, 128, 129 and 130 thus constitute elements so constructed, timed and arranged that the areas of the paths through which said elements travel overlap but are offset from front to rear so that one element (as 57) strips crops from the other (as 127, etc.). The fingers begin to project farther through the openings 131 as they approach the top of the auger shaft, with the result that the fingers are projected to almost their fullest extent as they pass the outer edges of the bats of the harvester reel 46, thus tending to strip the harvested crops from the reel and urging the crops downwardly and under the tubular auger shaft.

Thus, it is evident that the crops which are severed by the front portion of the cutter bar directly ahead of the feeder housing 26 are laid rearwardly over the cutter bar 45 and are engaged by the fully projected fingers 127 in the center section 57 of the auger shaft. Rotation of the latter sweeps the crops rearwardly under the center section 57 and merges the crops with the two streams of crops which are propelled inwardly by the auger blades 120, 121, the merger taking place directly in the front opening 42 in the feeder house 26. Inasmuch as the cylinder C generated by the fingers 127 about the axis D of the shaft 138 is forwardly eccentric as respects the axis A of the auger, there are provided increased spaces G and H at the inner terminal ends E and F of each auger, which facilitate the merging of the three streams of crops in front of the feed opening 42. In other words, the offsetting of the finger axis C removes the obstruction to lateral discharge of crops at the inner ends E and F of the augers, which obstruction exists in known structures in which the control feeder generates a cylinder coaxial with the augers. This desired result is achieved according to the present invention by offsetting the shaft 138, plus providing for retraction and extension of the fingers 127, without reducing the effective length of the fingers 127, which are enabled to move rearwardly closely over the bottom wall element 35a of the auger trough 35.

At this point, the crops are delivered to a second rotary crop propelling device or element 160, immediately behind the center auger section 57. The crop propelling device 160 comprises a tubular drum 161 rotatably mounted within the opening 42 and provided with four peripherally spaced rows of openings 162 through which are projected and retracted a plurality of fingers 163, the inner ends of which are mounted in hubs 164 journaled on a stationary shaft 165 offset forwardly and slightly above the axis of rotation of the drum 161. The details of the hubs for supporting the inner ends of the fingers, and the mounting of the stationary offset shaft 165 are similar to those explained in connection with the fingers in the central portion 57 of the auger shaft 56. It is to be noted, however, that the fingers 163 are projected to their fullest extent as they sweep downwardly behind the stripper plate 122 to the space between the latter and the drum 161. The fingers 163 pass downwardly in close proximiy to the retracted ends of the fingers 129 at the rear of the shaft section 57, thereby stripping the crops from the latter and urging the same downwardly and rearwardly under the drum 161. Thus the fingers 163 engage the crops which are forced inwardly along the two back walls 40, 41 and also engage the crops which are held beneath the auger shaft section 57, to urge the several streams of crops and propel them rearwardly along the floor 28 of the feeder housing 26. The fingers 163 are retracted into the drum 161 at the rear of the latter, thereby disengaging the crops. The crops are then engaged by means of an undershot raddle type conveyor 170, the latter comprising a third feeding element including three laterally spaced endless chains 171 trained over roller means provided by three sprockets 172 fixed on a shaft 173 which is slidable generally vertically in a pair of slots 174 in the side walls 29, 30 of the feeder house 26. The chains 171 are interconnected by transverse crop engageable slats 175. The chains 171 are trained around sprockets 176 fixed on the transverse shaft 31, and the latter is driven by suitable mechanism (not shown) to move the lower flight of the conveyor 170 rearwardly in engagement with crops delivered thereto by the crop propelling device 160, and thus moves the harvested crops rearwardly over the floor 28 and discharges the same into the threshing cylinder 19. The conveyor 170 is free to rise and fall to accommodate varying quantities of crops and it will be noted that the slats 175 pass around the forward sprockets 172 in close proximity to the retracted ends of the fingers 163 in the crop propelling device 160, thereby stripping the crops from the latter.

Power is supplied to the harvesting mechanism through a chain, indicated at 180 (see Figure 1), which is trained over a sprocket 181 on a shaft 182 extending transversely through the feeder house 26 and journaled in the walls thereof, the outer end of the shaft being journaled in a bearing 183 supported on a bracket 184 extending rearwardly from the end wall 36. A sprocket 185 is mounted on the shaft 182, over which the chain 85 is trained to receive power for driving the main auger 55. Another drive sprocket 187 is mounted on the shaft 182 and is connected by a chain 188 to a sprocket 189 attached to the reel shaft 47. The drive chain 180 is also trained around a sprocket 190, which is secured to one end of the drum 161 for rotating the latter.

Referring now more particularly to the embodiment of Figures 6–9, inclusive, the combine 200 is of the tractor drawn type comprising a longitudinally extending thresher body 201 carried on a pair of laterally spaced wheels 202, 203 and having a forwardly and laterally inclined draft tongue 204 which is secured at its rear end to the thresher body and is provided with a suitable hitch device 205 at its forward end for connection with the drawbar of a tractor. A brace 206 is attached at its forward end to the draft member 204 and extends laterally and rearwardly beneath the feeder house 26 of the harvesting mechanism. The rear end of the brace 206 is connected to the framework of the body 201. This embodiment of my invention is provided with a platform 35 which is generally similar to the platform hereinbefore described, except that it extends laterally in one direction only from the feeder house 26. The stubbleward end wall 37 of the platform lies substantially in a common fore and aft extending vertical plane with the stubbleward side wall 39 of the feeder house.

The platform auger conveyor 210 is supported entirely at its outer end in a bearing 211 mounted on the outer end wall 36 of the platform. The auger conveyor comprises a shaft 212 which extends inwardly from its supporting bearing 211 and has a conical inner end 212' terminating substantially in register with the grainward side wall 29 of the feeder house. A helical vane 213 is wound around the shaft 212 and cooperates with the stripper plate 123 to urge the harvested crops laterally inwardly along the grain pan 35, discharging the same in front of the opening 42 at the forward end of the feeder house.

A crop propelling device 215 is mounted in front of the front opening 42 in the feeder house for the purpose of receiving crops from the cutter bar 45 ahead of the opening 42 and propelling the severed crops rearwardly into the opening 42. The crop propelling device 215 is supported entirely from the stubbleward end wall 37 of the platform and extends over the trough or grain pan 35 in front of the crop receiving opening 42. The device 215 comprises a sheet metal drum 216 having a generally cylindrical form but the grainward end of which is tapered, as indicated at 217. The drum 216 is supported on a pair of laterally spaced spiders 218, 219, which are rigidly fixed within the drum 216 and have hubs 220, 221, which are journaled on a central shaft 222. The shaft 222 is rigidly fixed on a supporting block 223 which in turn is rigidly mounted by means of four bolts 224 on the inner side of a cover or shield 225 which fits over an opening 226 in the end wall 37 and is secured to the latter by bolts 227. Thus, the crop propelling device 215 is unsupported at its grainward end, which terminates near the stubbleward end 212' of the auger 210.

The tube or drum 216 is provided with series of circumferentially extending slots or perforations 230, through which are projected a plurality of crop engageable fingers 231 arranged in three rows, each row being mounted on a rockable shaft 232, 233, 234. The shafts 232, 233, 234 are journaled at opposite ends, respectively, in the two spiders 218, 219 and are spaced radially outwardly from the axis of the shaft 222. Each rockable shaft is provided with a cam follower shoe 235 mounted on the stubbleward end thereof within the cover 225. The shoes 235 are adapted to bear upon a camming surface 236 formed on the periphery of the supporting block 223. The camming surface 236 is substantially cylindrical throughout the lower forward quadrant of the supporting block 223 and is adapted to engage the camming shoes 235 on the finger control shafts 232, 233, 234 to swing the crop engageable fingers 231 into a generally radially extending position as the fingers approach the forward side of the drum 216, holding the fingers in a radial crop engaging position as they swing downwardly and under the drum, thereby propelling the severed crops rearwardly beneath the drum from the cutter bar 45 ahead of the crop propelling device 215. As the fingers 231 begin to swing upwardly behind the drum 216, the shoes 235 pass over the rear terminal edge 237 of the camming surface 236, thereby freeing the shafts at this point to permit the fingers 231 to swing downwardly and thus to be withdrawn longitudinally out of the severed crops behind the drum, thereby preventing any of the crops from being carried over the top of the drum. The fingers 231 lie generally tangentially of the drum as they pass over the top of the latter, until the shoes 235 again engage the upper end 238 of the camming surface 236, best shown in Figure 9.

As indicated in Figure 8, the stubbleward end of the drum 216 extends through the opening 226 in the side wall 37 into the hollow cover shield 225. A sealing sheet 240 is supported on the bolts 227 and covers the opening 226 between the end wall 37 and the drum 216. Preferably, the sheet 240 is flexible and has an inner edge 241 which slides upon the surface of the drum 216 to prevent dust and crops from entering the shield 225. Thus, the shield 225 and sealing sheet 240 constitute a closed housing for the camming shoes 235 and block 223. In this housing is also disposed the mechanism for driving the drum 216, and includes a sprocket 243 having teeth encircling the end of the drum 216 and secured thereto. The sprocket 243 is disposed in a plane spaced in a stubbleward direction from the plane of the end wall 37 and a drive chain 244 is trained around the sprocket 243 and extends upwardly through suitable openings in the cover shield 225 and is trained around a sprocket 245, which is mounted on an idler shaft 246 carried on the end wall 37. A second sprocket 247 is mounted on the idler shaft 246 and rigidly secured to the sprocket 245, and is driven by a chain 248 which extends rearwardly to a drive sprocket 249 mounted on the drive shaft 31 which also drives the conveyor 170. The shaft 31 is driven by a power transmitting chain trained over a drive sprocket 250 on the shaft 31.

The auger 210 is driven by means of a power transmitting chain 253 trained over a sprocket 254 on the drive shaft of the auger and over a drive sprocket 255 mounted on a power shaft 256 extending transversely behind the platform and through the upper portion of the feeder house 26. A sprocket 257 is fixed to the shaft 256 on the stubbleward side of the feeder house 26 and is driven by a chain 258 which is trained over a third sprocket 259 mounted on the shaft 31.

In this embodiment of the invention it will be noted that the crop propelling device 215 and the auger 210 are entirely separate, which provides several advantages. One of the advantages is that the speed of rotation of the auger can be made greater than the speed of the crop propelling device 215. It has been found somewhat desirable to drive the crop propelling device 215 at a somewhat slower speed in order to prevent the crops from being propelled rearwardly into the opening 42 at an excessive rate of speed. The auger 210, however, must be rotated at a fairly high speed in order to clear the crops away from the platform as fast as they are delivered thereto by the cutter bar 45. With this construction, another advantage is that the crop propelling device 215 need not be disposed coaxially with the auger 210, and therefore permits greater freedom in designing the two crop propelling devices 169, 215, and the auger 210, as to diameter of drum, length of fingers, and height above the platform 35 and bottom floor 28 of the feeder house.

I claim:

1. In a harvester including a body housing provided with a crop-receiving opening through which crops may be fed in a defined path, and a crop-receiving platform in advance of the opening and of elongated construction and disposed transversely to said path of crop feeding so as to extend across the opening as well as laterally to one side thereof, the improvement residing in conveying and feeding means for moving crops lengthwise of the platform to the opening and then feeding such crops along said path and through said opening, said means comprising: an elongated tubular member rotatably supported on and extending lengthwise over the platform and in advance of said opening; a helical auger blade fixed on said member and wound to move crops lengthwise on said platform toward said opening; a plurality of crop-engaging elements movably mounted for extension and retraction on that portion of said tubular member directly in advance of said opening; and means controlling said elements and operative in response to rotation of said tubular member for extending said elements in advance of said tubular member into engagement with crops on said platform for sweeping such crops along the aforesaid path of crop feeding toward said opening and for retracting said elements behind said tubular member to disengage said elements from the crops being fed thereby toward said opening.

2. The invention defined in claim 1, further characterized in that: the portion of the tubular member in advance of said opening has perforations therein, and the crop-engaging elements are carried within the tubular member and are extended and retracted through said perforations.

3. In a harvester including a longitudinally extending body housing having a crop receiving opening at its forward end and a harvesting platform extending laterally from said housing, the improvement residing in a conveyor for moving crops on said platform toward said housing comprising a tubular member rotatably supported above said platform, a helical auger blade fixed thereon, said member having perforations in the portion adjacent said housing, a plurality of crop engageable fingers extending outwardly of said tubular member through said perforations, means responsive to rotation of said member for projecting said fingers into engagement with crops to sweep the crops rearwardly in said housing and for retracting said fingers inwardly of said perforations to disengage said fingers from the crops behind said tubular member, and a rotary crop moving device disposed within said housing, said device comprising a perforated drum having crop engageable fingers therewithin and control means in said drum responsive to rotation thereof for projecting said fingers through said perforations into proximity with the retracted ends of the fingers in the rear side of said tubular conveyor member, said drum fingers being adapted to swing rearwardly in projected relation to said drum and to be retracted at the rear of said drum to disengage the crops.

4. In a harvester including a longitudinally extending body housing having a crop receiving opening at its forward end and a harvesting platform extending laterally from said housing, the improvement residing in a conveyor for moving crops on said platform toward said housing comprising a tubular member rotatably supported above said platform, a helical auger blade fixed thereon, said member having perforations in the portion adjacent said housing, a plurality of crop engageable fingers extending outwardly of said tubular member through said perforations, means responsive to rotation of said member for projecting said fingers into engagement with crops to sweep the crops rearwardly in said housing and for retracting said fingers inwardly of said perforations to disengage said fingers from the crops behind said tubular member, and a rotary crop moving device disposed within said housing, said device comprising a perforated drum having crop engageable fingers therewithin and control means in said drum responsive to rotation thereof for projecting said fingers through said perforations into proximity with the retracted ends of the fingers in the rear side of said tubular conveyor member, said drum fingers being adapted to swing rearwardly in projected relation to said drum and to be retracted at the rear of said drum to disengage the crops, a flexible endless conveyor behind said crop moving device, and a roller rotatably mounted in proximity to the retracted ends of said fingers in said device, said endless conveyor being trained over said roller and movable to strip crops from said device and propel them rearwardly in said housing.

5. In a harvester including a longitudinally extending body housing having a crop receiving opening in its forward end and a harvesting platform having a front crop-receiving edge extending across the forward end of said housing in front of said opening and also extending laterally from said housing, the improvement residing in a conveyor for receiving crops from said front crop-receiving edge and for moving such crops on said platform toward said housing opening, said conveyor comprising a tubular member rotatably supported above said platform, a helical auger blade fixed thereon, said member having perforations in the portion in front of said housing opening, a plurality of crop engageable fingers in said tubular member projectable and retractable out of and into the latter, means responsive to rotation of said member for projecting said fingers forwardly and downwardly into engagement with crops in front of said member to sweep the crops rearwardly into said opening and for retracting said fingers inwardly of said perforations to disengage said fingers from the crops behind said tubular member, and a rotary crop moving device disposed within said housing, said device comprising a perforated drum having crop engageable fingers therewithin and control means in said drum responsive to rotation thereof for projecting said fingers through said perforations into proximity with the retracted ends of the fingers in the rear side of said tubular conveyor member, said drum fingers being adapted to swing rearwardly in projected relation to said drum and to be retracted at the rear of said drum to disengage the crops.

6. In a harvester including a longitudinally extending body housing having an open forward end, a platform having a front crop-receiving edge extending across the forward end of said housing in front of said opening and also extending laterally therefrom, a back wall on said platform extending laterally from said housing substantially in the plane of said housing opening, and a pair of end walls on said platform, the improvement residing in a conveyor for receiving crops from said front crop-receiving edge and for moving harvested crops on said platform toward said housing opening, said conveyor comprising a tubular shaft disposed over said platform and journaled at opposite ends, respectively, on said end walls, a helical auger blade mounted on said shaft, a stripper plate extending forwardly from said back wall and having a front edge in proximity to the outer edge of said auger blade, said plate extending transversely along said back wall and over said housing opening, there being perforations in said tubular shaft in front of said opening, fingers disposed within said shaft and shiftable outwardly thereof through said perforations, control mechanism responsive to rotation of said shaft for projecting said fingers forwardly to engage crops in front of said shaft and to sweep the same under said shaft incident to rotation and for retracting said fingers from the crops behind said shaft, and a crop propelling device behind said shaft within said housing comprising a rotatable member having crop-engaging elements associated therewith, said last-named fingers being movable, during rotation of said member, forwardly and downwardly beneath said stripper plate and behind said conveyor shaft to sweep the crops rearwardly under said member into said housing.

7. In a harvester having a fore and aft extending body provided with a forwardly directed feed opening ahead of which is disposed a transverse platform structure including a pair of platform extensions respectively projecting laterally beyond opposite sides of the feed opening, the improvement residing in means for moving crops laterally inwardly over the platform structure and rearwardly to the feed opening, comprising: rotatable conveyor means of elongated, generally cylindrical construction having means for the rotatable mounting thereof on its principal axis on and to extend laterally over the platform structure, and including a pair of helically vaned portions respectively positionable over the platform extensions and a rotatable tubular portion intermediate and coaxial with the vaned portions and positionable ahead of the feed opening, said tubular portion having its peripheral wall provided with a plurality of perforations; a plurality of crop-engaging fingers carried by the tubular portion for rotation therewith; means mounting the fingers on the tubular portion for extension and retraction thereof through the perforations in the peripheral wall structure; and means for effecting extension and retraction of the fingers as the tubular portion rotates.

8. In a harvester having a fore and aft extending body provided with a forwardly directed feed opening ahead of which is a transversely elongated platform structure including a part in front of the feed opening and a transversely elongated part adjoining and projecting laterally as an extension of the part in front of the feed opening, the improvement residing in crop-moving conveyor means, comprising: a first, elongated, generally cylindrical crop-moving conveyor portion extending lengthwise over the extension part of the platform and having means for the mounting thereof on the platform structure for rotation about its principal axis, and including a helical vane thereon about said axis for moving crops laterally toward the feed opening; and a second rotatable crop-moving conveyor portion of hollow cylindrical construction disposed ahead of the feed opening over the proximate platform part and coaxial with the first conveyor portion, crop-engaging fingers carried by said second conveyor portion for rotation therewith and mounted within and for extension and retraction outwardly and inwardly relative to said second conveyor portion, and means for effecting extension and retraction of said fingers as said second conveyor portion rotates.

9. In a harvester having a fore and aft extending body provided with a forwardly directed feed opening ahead of which is a transversely elongated platform structure including a part in front of the feed opening and a transversely elongated part adjoining and projecting laterally as an extension of the part in front of the feed opening, the improvement residing in crop-moving conveyor means, comprising: a first, elongated crop-moving conveyor portion extending lengthwise over the extension part of the platform and having means for the mounting thereof on the platform structure for movement relative to the platform structure to move crops laterally toward the feed opening; and a second, rotatable crop-moving conveyor portion of hollow cylindrical construction disposed ahead of the feed opening over the proximate platform part and alined lengthwise with the first conveyor portion so that the first conveyor portion feeds crops directly and lengthwise thereof into said second portion, crop-engaging fingers carried by said second conveyor portion for rotation therewith and mounted within and for extension and retraction outwardly and inwardly relative to said second conveyor portion, and means for effecting extension and retraction of said fingers as said second conveyor portion rotates.

10. In a harvester having a fore and aft extending body provided with a forwardly directed feed opening ahead of which is a transversely elongated platform structure including a part in front of the feed opening and a transversely elongated part adjoining and projecting laterally as an extension of the part in front of the feed opening, the improvement residing in crop-moving conveyor means, comprising: a first, elongated crop-moving portion extending lengthwise over the extension part of the platform and having means for the mounting thereof on the platform structure for movement relative to the platform structure to move crops in a transverse path toward the feed opening; and a second crop-moving portion disposed ahead of the feed opening over the proximate platform part and alined lengthwise with the first conveyor portion so that the first conveyor portion feeds crops directly and lengthwise thereof into said second portion and said second portion having a pair of relatively movable crop-engaging elements, each arranged to move in a closed orbital path transverse to the feeding path of the first conveyor portion to move crops rearwardly to the feed opening, and said elements being so constructed, timed and arranged that the areas of the paths through which said elements travel overlap but are offset from front to rear so that one element tends to strip crops from the other.

11. In a harvester having a longitudinal body provided at its forward end with a crop-receiving opening having opposite sides and a bottom, the improvement comprising: means providing a transverse elongated auger trough including a bottom wall element having a first portion extending across the crop-receiving opening generally at the level of the bottom of said opening and a continuing second portion projecting horizontally laterally outwardly beyond one side of said opening, and a generally upright rear wall element joined to and substantially coextensive with said second portion of the bottom wall element and having an inner terminal end adjacent said one side of said opening; an elongated auger means rotatably carried above said second portion of the bottom wall element and spaced closely ahead of and substantially coextensive with the rear wall element to have an inner terminal end adjacent said one side of the crop-receiving opening, said auger being rotatable to move crops downwardly against the bottom wall element and rearwardly against the rear wall element and simultaneously laterally inwardly toward the first portion of the bottom element; and feeder means disposed above said first portion of the bottom element and ahead of the crop-receiving opening, adjoining the auger means at said terminal end of the upright rear wall and rotatable about an axis parallel to but offset in a fore and aft direction from the axis of the auger means, said feeder means including crop-engaging elements movable in a closed path in an orbit having said offset axis as a center to travel rearwardly closely over said first portion of the bottom wall element and then upwardly ahead of a transverse upright plane including said rear wall element, the dimensions of said auger means and said feeder means and the aforesaid offset of said auger and feeder axes being such that the surface generated by the moving crop-engaging elements is ahead of that generated by the auger means to provide an unobstructed area at the junction of the auger and feeder means so that crops moved along the rear and bottom wall of the trough may pass directly below and behind the feeder means.

12. The invention defined in claim 11, further characterized in that: said feeder means comprises a rotatable perforated drum coaxial with the auger and ahead of the crop-receiving opening; a control shaft is disposed within said drum on said offset axis; and said crop-engaging elements comprise a plurality of fingers carried at their inner ends on said control shaft for angular movement about said offset axis, said fingers projecting radially outwardly respectively through said perforated drum and having outer ends movable in the aforesaid circular path.

13. The invention defined in claim 12, further characterized in that: the auger means includes an elongated tubular core; and the control shaft within the drum has an extension passing lengthwise through said core to the outer end of the auger means.

14. In combination, a tubular rotatable shaft, a helical auger blade mounted thereon, said shaft having a plurality of perforations, a plurality of fingers disposed within said shaft and shiftable inwardly and outwardly thereof through said perforations, and control means responsive to rotation of said shaft for projecting and retracting said fingers.

15. In combination, a tubular rotatable supporting shaft, a helical auger blade mounted thereon and terminating intermediate the ends thereof, a portion of said shaft adjacent the terminal end of said blade having rows of perforations, fingers disposed within said shaft and shiftable inwardly and outwardly thereof through said perforations, and control means responsive to rotation of said shaft for projecting and retracting said fingers.

16. In combination, a tubular rotatable supporting shaft, a pair of helical auger blades oppositely wound on said shaft and having their adjacent ends terminating in axially spaced relation, the portion of said shaft between said ends having rows of perforations, fingers disposed within said shaft and shiftable inwardly and outwardly thereof through said perforations, and control means for projecting and retracting said fingers.

17. In combination, a tubular rotatable shaft, a pair of helical auger blades oppositely wound on said shaft and having their adjacent ends terminating in axially spaced relation, the portion of said shaft between said ends having a plurality of perforations, fingers disposed within said shaft and shiftable outwardly thereof through said perforations, a relatively stationary supporting shaft extending coaxially into one end of said tubular shaft through the auger-blade-carrying portion thereof and terminating at said perforated portion, bearing means journaling said tubular shaft on said stationary shaft, a control shaft mounted on the inner end of said stationary shaft with its major axis disposed in radially offset relation thereto, and means on said control shaft connected to the inner ends of said fingers and rotatable with the latter about the axis of said control shaft during rotation of said tubular shaft, thereby causing said fingers to project and retract through said perforations.

18. In combination, a tubular rotatable shaft comprising three shaft sections having detachable securing means joining said sections in coaxial end-to-end relation, a pair of helical auger blades oppositely wound on the two outer sections, respectively, the central tubular shaft section having a plurality of perforations, fingers disposed within said central section and shiftable outwardly thereof through said perforations, a relatively stationary supporting shaft extending into one end of said tubular shaft through one of said outer sections coaxially therewith and terminating at the adjacent end of said central section, bearing means journaling said tubular shaft on said stationary shaft, a control shaft having one end fixedly mounted on the inner end of said stationary shaft and extending through said central shaft section with its major axis disposed in radially offset relation to the axis of said tubular shaft, a supporting shaft at the opposite end of said control shaft and coaxial with said tubular shaft, means fixedly mounting said other end of said control shaft on said last-mentioned supporting shaft, bearing means in the adjacent outer section in which said last-mentioned supporting shaft is journaled, and means on said control shaft connected to the inner ends of said fingers and rotatable with the latter about the axis of said control shaft during rotation of said tubular shaft, thereby causing said fingers to project and retract through said perforations.

19. In a conveyor: an elongated, material-receiving trough having side walls in one of which is formed a material outlet opening; an elongated tubular shaft extending lengthwise of the trough and having a helical blade thereon for engaging and moving material lengthwise of the trough toward said outlet opening, and further having a portion generally coextensive with the outlet opening provided with a plurality of perforations therein; fingers within said portion and projecting through the perforations; and means mounting the fingers inside said portion for rotation with the shaft and for extension and retraction through the perforations to move material transversely of the trough and toward said outlet opening.

20. In a conveyor: an elongated, material-receiving trough having side walls lengthwise thereof, one of which walls is formed intermediate its ends with an outlet opening; an elongated tubular shaft extending lengthwise from end to end of the trough and across said outlet opening, said shaft including three coaxial portions rotatable in unison about the shaft axis, one of said portions being substantially coextensive with the outlet opening and the other two portions extending respectively beyond the opening toward the ends of the trough; a pair of oppositely wound helical blades respectively on said two portions and terminating respectively at the outlet opening so that said one portion is blade-less, said one portion having a plurality of perforations therein; fingers within said one portion and projecting through the perforations; and means mounting the fingers inside said one portion for rotation with the shaft and for extension and retraction through the perforations.

ALVIN W. OEHLER.

REFERENCES CITED

The following references are of record in the file of this patent:

UNITED STATES PATENTS

| Number | Name | Date |
| --- | --- | --- |
| 931,109 | Wixcel | Aug. 17, 1909 |
| 1,250,337 | Mowry | Dec. 18, 1917 |
| 1,859,586 | Gottschall et al. | May 24, 1932 |
| 2,132,210 | Hanson | Oct. 4, 1938 |
| 2,169,472 | Oehler et al. | Aug. 15, 1939 |
| 2,270,471 | Pilcher et al. | Jan. 20, 1942 |
| 2,286,095 | Innes | June 9, 1942 |
| 2,301,578 | Pilcher et al. | Nov. 10, 1942 |
| 2,347,138 | Stevens | Apr. 18, 1944 |
| 2,377,805 | Oehler | June 5, 1945 |
| 2,426,922 | Carroll | Sept. 2, 1947 |
| 2,455,905 | Ronning | Dec. 7, 1948 |
| 2,455,906 | Ronning | Dec. 7, 1948 |